United States Patent Office 3,798,230
Patented Mar. 19, 1974

---

3,798,230
O,O-DIALKYL-O-[1-OXA-2,4-DIAZOLIDINON-5-YL-3]-THIONOPHOSPHATES
Peter Beutel, Mannheim, Karl-Heinz Koenig, Frankenthal, Wolfram Dietsche, Altrip, and Heinrich Adolphi, Limburgerhof, Germany, assignors to Badische Anilin- & Soda-Fabrik Aktiengesellschaft, Ludwigshafen (Rhine), Germany
No Drawing. Filed Feb. 17, 1971, Ser. No. 116,231
Claims priority, application Germany, Mar. 5, 1970, P 20 10 396.2
Int. Cl. C07d 85/52
U.S. Cl. 260—307 A    6 Claims

ABSTRACT OF THE DISCLOSURE

O,O-dialkyl-O-[1 - oxa - 2,4 - diazolidinon-5-yl-3]-thionophosphates having a substituent in the 4-position, said thionophosphates having a good insecticidal action and a process for controlling insects with these compounds, such compounds including O,O-diethyl-O-[4-n-propyl-1-oxa - 2,4 - diazolidinon-5-yl-3]-thionophosphate and O,O-diethyl - O - [4-phenyl-1-oxa-2,4-diazolidinon-5-yl-3]-thionophospnate.

---

The present invention relates to new and valuable phosphoric ester derivatives having a strong insecticidal action; insecticides containing these compounds as active ingredients; and a process for their manufacture.

It is known to use S-(1,2-dicarbethoxyethyl) O,O-dimethyl dithiophosphate (U.S. Pat. No. 2,578,652; German Pat. No. 847,897); O,O-diethyldithiophosphoryl-3-methyl - 6 - chlorobenzoxazoline-(2) (Belgian Pat. No. 609,209); and 2-(O,O-dimethylthiolophosphorylmethyl)-5-methoxy-4-pyrone (German printed application No. 1,004,422; U.S. Pat. No. 2,811,476) for combatting insects. However, their action is not always satisfactory.

We have now found that phosphoric ester derivatives of the formula

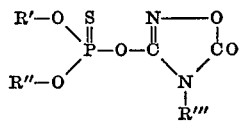

where R' and R'' each denote lower alkyl (methyl, ethyl), R''' denotes lower alkyl (methyl, ethyl, n-propyl, isopropyl, n-butyl, sec-butyl, tert-butyl), cycloalkyl (cyclohexyl), alkenyl, (vinyl, allyl), alkynyl (methylbutyn-1-yl-3), lower alkoxyalkyl (3-methoxypropyl, 3-ethoxypropyl, 2-methoxyethyl, 2-ethoxyethyl), lower alkylthioalkyl (3-methylthiopropyl, 3-ethylthiopropyl, 1-methyl-2-methylthioethyl, 1-methyl-2-isopropylthioethyl), haloalkyl-(γ chloropropyl, β-chloroethyl, mono-chloro-tert-butyl, 1-chloromethylpropyl-1, β-chloro-n-propyl), lower alkoxycarbonylalkyl (ethoxycarbonylmethyl), aryl (phenyl), or substituted aryl (phenyl substituted by halogen (fluorine, chlorine or bromine), trifluoromethyl, methylsulfonyl, lower alkyl (methyl) or lower alkoxyl (methoxyl)) have a good insecticidal action.

The active ingredients may be prepared by reacting a O,O-dialkylthionophosphoric ester halide of the formula

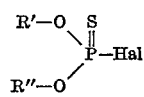

where R' and R'' have the above meanings and Hal denotes a halogen (chlorine, bromine) atom, with an oxadiazolidinedione of the formula

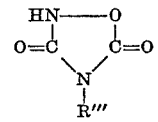

where R''' has the above meanings.

The substances are advantageously prepared in the presence of acid-binding agents, e.g., alkali metal carbonates, alkali metal alcoholates, alkali metal hydroxides, and organic bases such as pyridine or trialkylamines. However, it is also possible to react preferably the alkali metal salts of the oxadiazolidinediones having the above formula with thionophosphoric ester halides having the above formula. The reaction is preferably carried out in an inert organic solvent at temperatures of from 0° to 150° C., preferably from 30° to 100° C. Particularly suitable solvents are ketones, benzene, toluene, dioxane, nitriles such as acetonitrile or propionitrile, dimethylformamide, dimethyl sulfoxide and esters of organic acids. To improve the yield, the mixture is, after the starting products have been united, kept for a fairly long time at the required temperature with stirring. The thionophosphoric ester halides employed as starting products are known. The oxadiazolidinediones may be prepared in known manner by addition of isocyanates to N-hydroxyurethanes and subsequent cyclization with bases, e.g., sodium methylate. As a result of the large number of isocyanates which may be used, it is possible to obtain many differently substituted oxadiazolidinediones whose phosphoric esters of the above formula have good insecticidal properties. The new thionophosphoric esters are usually colorless to reddish colored oils which are insoluble in water and are difficult to distill without decomposition even in a high vacuum. The compounds have an excellent action on a wide range of pests, e.g., cockroaches, grain weevils, caterpillars, and mosquito larvae, some of them having low toxicity to warm bloods. Because of these excellent herbicidal properties, the compounds according to the invention are eminently suitable as pesticides in the plant protection field, e.g. for fruit and vegetables, cotton crops, and forestry nurseries.

The preparation and use of the new compounds are illustrated by way of the following examples.

The sodium salts of the oxadiazolidinediones may be prepared in accordance with the following equation:

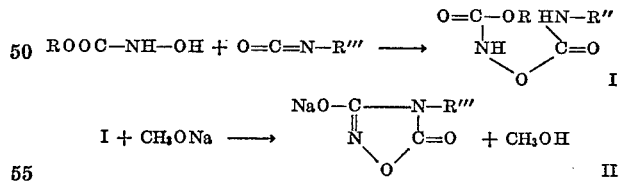

They are obtained in good yield and high purity by first adding, in an inert solvent, the isocyanate to the hydroxy urethane (Equation I), and then replacing the solvent by an alcohol, e.g., ethanol, and cyclizing with technical-grade methanol solution; to complete the reaction the mixture is boiled for some time under reflux. After a short time the sodium salts precipitate out or may, depending on the substituents, be isolated in vacuo by removing the solvent. The salts obtained in this manner are sufficiently pure for subsequent phosphorylation.

EXAMPLE 1

Sodium salt of 4-tert-butyl-oxadiazolidinedione-3,5

3 mils. of triethylamine is added to 1 mole of 4-N-hydroxyurethane in 500 mls. of benzene; 1 mole of tert-butyl isocyanate is then dripped in and the whole heated for 1 hour under reflux. The benzene is then evaporated off and replaced by alcohol. 1 mole of technical-grade methanol solution is dripped in and the mixture heated for 18 hours under reflux. The solvent is subsequently evaporated and drying effected at 80° C. and 1 mm. Hg.

Yield: approx. 90%; M.P.: <360° C. (decomposes).

EXAMPLE 2

Sodium salt of 4-phenyloxadiazolidinedione-3,5

3 mls. of triethylamine is added to 2 mole of N-hydroxyurethane in 500 mls. of benzene; 1 mole of phenyl isocyanate is then dripped in. The mixture is heated for 1 hour under reflux and the benzene subsequently removed in vacuo.

The residue is taken up in 500 mls. of ethyl alcohol and 1 mole of technical-grade methanol solution is dripped in. The mixture is heated for 1 hour at 60° C. and cooled, and the sodium salt is suction filtered.

Yield: 50%; M.P.: 150° to 230° C. (decomposes).

A further 45% of a somewhat impure product may be obtained from the mother liquor by evaporation.

All the other salts may be prepared in a manner analogous to that described in Example 1 or 2.

EXAMPLE 3

O,O-diethyl-O-[4-n-propyl-1-oxa-2,4-diazolidinon-5-yl-3-]-thionophosphate

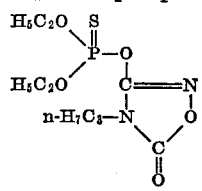

24.91 parts by weight of the sodium salt of 4-n-propyloxazolidinedione is suspended in 150 parts of acetonitrile and the suspension heated at 50° C. Over a period of about 10 minutes, 28.35 parts of O,O-diethylthiophosphoryl chloride is dripped in. Subsequently the temperature is increased until the mixture boils under reflux; the mixture is then kept at this temperature for five hours. After cooling to room temperature (20° C.), the mixture is suction filtered to remove precipitated NaCl and the solvent is removed in vacuo. The residue, 45.3 parts of a turbid, orange-colored oil, is taken up in 300 parts of benzene and washed once with 40 parts of H₂O, once with 40 parts of 10% by weight aqueous NaHCO₃ solution and once with 40 parts of 3% by weight aqueous NaHCO₃ solution. The benzene phase is separated, drying is effected over Na₂SO₄, the solvent is removed and the residue freed from volatile impurities over a period of 2 hours at 90° C. and 0.5 mm. Hg.

Yield: 34.2 parts of orange-colored oil; $n_D^{20}$:1.4822.

EXAMPLE 4

O,O-diethyl-O-[4-phenyl-1-oxa-2,4-diazolidinon-5-yl-3]-thionophosphate

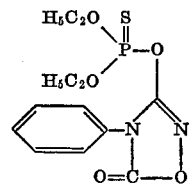

30 parts of the sodium salt of 4-phenyloxadiazolidinedione is suspended in 150 parts of dimethylformamide and the suspension heated at 50° C. 28.35 parts of O,O-diethylthiophosphoryl chloride is dripped in and the mixture heated at 80° C. for six hours.

After cooling, the mixture is suction filtered to remove precipitated NaCl and the filtrate is concentrated in vacuo, poured into water, taken up in benzene and washed twice with 50 parts of 3% by weight aqueous NaHCO₃ solution. After drying over Na₂SO₄, filtration and removal of the solvent, the substance is freed from volatile constituents by treatment for 2 hours at 90° C. and 0.5 mm. Hg in a rotary evaporator.

Yield: 32.2 parts of a reddish oil; $n_D^{20}$: 1.5160.

Further compounds may be prepared in accordance with Example 3. Some of the synthesized compounds are listed below.

| Number: | R′ and R″ | R‴ | $n_D^{20}$ |
|---|---|---|---|
| 1 | C₂H₅ | —CH₃ | 1.4902 |
| 2 | C₂H₅ | —C₂H₅ | 1.4910 |
| 3 | C₂H₅ | n-C₃H₇ | 1.4822 |
| 4 | C₂H₅ | i-C₃H₇ | 1.4888 |
| 5 | C₂H₅ | n-C₄H₉ | 1.4800 |
| 6 | C₂H₅ | sec-C₄H₉ | 1.4762 |
| 7 | C₂H₅ | tert-C₄H₉ | 1.4742 |
| 8 | C₂H₅ | —CH₂—C(=O)OC₂H₅ | 1.4854 |
| 9 | C₂H₅ | (phenyl) | 1.5160 |
| 10 | C₂H₅ | (cyclohexyl, H) | 1.4953 |
| 11 | C₂H₅ | —CH(CH₃)—CH₂—S—CH₃ | 1.5062 |
| 12 | C₂H₅ | —C(CH₃)(CH₃)—CH₂—Cl | 1.4910 |
| 13 | C₂H₅ | —CH(CH₃)—CH₂—Cl | 1.4918 |
| 14 | C₂H₅ | —CH₂—CH₂—Cl | 1.4964 |
| 15* | C₂H₅ | —(phenyl)—Cl | 1.5468 |
| 16 | C₂H₅ | CF₃ | 1.4938 |
| 17* | C₂H₅ | —(phenyl)(CH₃) | 1.5210 |
| 18* | C₂H₅ | —(phenyl)Cl | 1.5397 |
| 19 | C₂H₅ | —CH₂—CH₂—S—CH₃ | 1.5168 |
| 20 | C₂H₅ | —CH(CH₃)—CH₂—S—C₃H₇ | 1.4968 |
| 21* | C₂H₅ | —(phenyl)OCH₃ | 1.5353 |
| 22 | C₂H₅ | —CH₂—CH₂—S—C₂H₅ | 1.5126 |
| 23 | C₂H₅ | —CH₂—CH₂—CH₂—O—CH₃ | 1.4871 |
| 24* | C₂H₅ | —(phenyl)—F | 1.5151 |
| 25* | C₂H₅ | —(phenyl)(Cl,Cl) | 1.5391 |
| 26 | CH₃ | —CH₂—CH₂—S—C₂H₅ | ---------- |
| 27 | CH₃ | —C(CH₃)(CH₃)—C≡CH | ---------- |

See footnote at end of table.

TABLE—Continued

| | R' and R'' | R''' | $n_D^{20}$ |
|---|---|---|---|
| 28 | CH₃ | —C(CH₃)(C₂H₅)—C≡CH | |
| 29 | C₂H₅ | —C(CH₃)(CH₃)—CH₂—Br | |
| 30 | C₂H₅ | —C(CH₂—Cl)(CH₂—Cl)—CH₂—Cl | |
| 33* | C₂H₅ | —C(CH₃)(CH₃)—C₆H₅ | |
| 34 | C₂H₅ | —C(CH₃)(CH₃)—CH₂—S—CH₃ | |
| 35 | —CH₃ | —C(CH₃)(CH₃)—CH₂—O—CH₃ | |
| 36 | C₂H₅ | —C(CH₃)(CH₃)—CH₂—S—C₂H₅ | |
| 37 | C₂H₅ | —CH₂—CH(CH₃)(CCl₃) | |
| 38 | —CH₃ | H₃C—CH(CH₃)—CH(CH₃)—CH₂—CH₃ | |
| 39 | —CH₃ | —CH₂—CH₂—CH₂—CH₂—CH₃ | |
| 40* | —CH₃ | —C(CH₃)(CH₃)—C₆H₅ | |
| 41 | C₂H₅ | —CH(CH₃)(CH₂—S—CH₃) | |
| 42 | C₂H₅ | —CH(CH₃)(CH₂—O—CH₃) | |
| 43* | C₂H₅ | —C(CH₃)(C≡CH)—C₆H₅ | |
| 44 | C₂H₅ | CH₃—C(CH₃)(CH=CH₂) | |
| 45 | C₂H₅ | H₃C—CH₂—C(CH₃)—CH=CH₂ | |

*The symbol —⟨O⟩ designates a phenyl ring.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The insecticidal action of the new compounds is demonstrated by the following experiments. The numbering of the samples corresponds to the numbers of the active ingredients in the above list.

The following prior art active ingredients were used for comparison purposes.

(I) S-(1,2-dicarbethoxyethyl) O,O-dimethyl dithiophosphate:

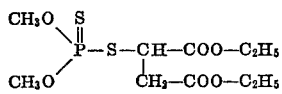

(U.S. Pat. No. 2,578,652; German Pat. No. 847,897).

(II) O,O - diethyldithiophosphoryl-3-methyl-6-chlorobenzoxazolone:

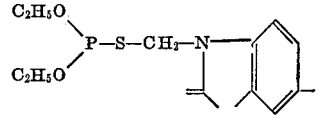

(III) 2 - (O,O - dimethylthiolophosphorylmethyl)-5-methoxy-4-pyrone:

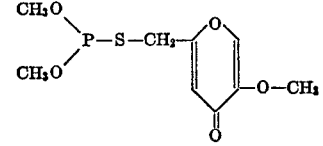

(German printed application No. 1,004,422; U.S. Pat. No. 2,811,476).

EXAMPLE 5

Action on larvae of the yellow fever mosquito

Larvae of the yellow fever mosquito (*Aedes aegypti*) in the fifth larval stage are exposed for a period of 24 hours to the active ingredients in 250 mls. of boiled, filtered water. The following results are obtained.

| Active ingredient: | Lowest active ingredient concentration in water at a larvae kill rate of over 80%, p.p.m. |
|---|---|
| 1 | 0.1 |
| 2 | 0.05 |
| 5 | 0.02 |
| 6 | 0.02 |
| 7 | 0.02 |
| 9 | 0.04 |
| 10 | 0.02 |
| Comparative agents: | |
| I | 0.2 |
| II | 1.0 |
| III | 5.0 |

EXAMPLE 6

Contact action on houseflies (administration test)

1 mm.$^3$ of an acetonic solution of the active ingredients in-administered to the ventral abdomen of houseflies (*Musca domestica* L.) under mild $CO_2$ narcosis. The mortality rate after 4 hours is used to determine the $LD_{50}$ values.

| Active ingredient: | $LD_{50}$ |
|---|---|
| 1 | 0.35/fly. |
| 2 | 0.45/fly. |
| 3 | 0.26/fly. |
| 4 | 0.25/fly. |
| 5 | 0.2/fly. |
| 6 | 0.3/fly. |
| 7 | 0.27/fly. |
| 8 | 0.34/fly. |
| 9 | 0.37/fly. |
| Comparative agent: | |
| I | 0.8/fly. |
| II | 1.0/fly. |
| III | 10.0/fly no effect. |

EXAMPLE 7

Contact action on cockroaches

Adult oriental cockroaches (*Blatta orientalis*) are placed in 1 liter beakers whose inside walls have been uniformly treated with an acetonic solution of the active ingredients. After the acetone has evaporated, a thin even film of the active ingredients is left behind on the glass walls. The mortality rate is determined after 48 hours.

| Active ingredient: | Lowest active ingredient amount per glass at a mortality rate of over 80%, mg. |
|---|---|
| 1 | 0.25 |
| 2 | 0.25 |
| 3 | 0.25 |
| 4 | 0.25 |
| 5 | 0.25 |
| 6 | 0.25 |
| 7 | 0.25 |
| 9 | 0.25 |
| Comparative agent: | |
| I | 0.5 |
| II | 2.5 |
| III | 5.0 |

The experiments show that the new active ingredients are clearly superior to the prior art active ingredients.

EXAMPLE 8

70 parts by weight of Compound 1 is mixed with 30 parts by weight of N-methyl-α-pyrrolidone. A mixture is obtained which is suitable for application in the form of very fine drops.

EXAMPLE 9

20 parts by weight of Compound 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 10

20 parts by weight of Compound 3 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 11

20 parts by weight of Compound 4 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing in 20,000 parts by weight of water, a spray liquid is obtained containing 0.1% by weight of the active ingredient.

EXAMPLE 12

3 parts by weight of Compound 5 is intimately mixed with 97 parts by weight of particulate kaolin. A dust is obtained containing 3% by weight of the active ingredient.

EXAMPLE 13

30 parts by weight of Compound 6 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A phosphoric ester derivative of the formula

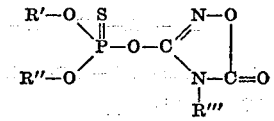

where R' and R" each denote methyl or ethyl, and R''' denotes alkyl having 1–6 carbon atoms, cyclohexyl, alkoxyalkyl having a total of 3–5 carbon atoms, alkylthioalkyl having a total of 3–6 carbon atoms, chloroalkyl having 2–4 carbon atoms and 1–3 chlorine atoms, 2-bromo-1,1-dimethylethyl, trifluoromethyl, ethyoxycarbonylmethyl, phenyl, chlorophenyl, fluorophenyl, chlorobromophenyl, dichlorophenyl, trifluoromethylphenyl, methoxyphenyl, or methylphenyl.

2. A compound as claimed in claim 1 wherein R' and R" each denote ethyl and R''' denotes sec-butyl.

3. A compound as claimed in claim 1 wherein R' and R" each denote ethyl and R''' denotes tert-butyl.

4. A compound as claimed in claim 1 wherein R' and R" each denote ethyl and R''' denotes o-methylphenyl.

5. A compound as claimed in claim 1 wherein R' and R" each denote ethyl and R''' denotes

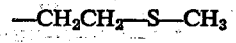

6. A compound as claimed in claim 1 wherein R' and R" each denote ethyl and R''' denotes p-fluorophenyl.

References Cited
UNITED STATES PATENTS
3,239,532   3/1966   Rufenacht _____ 260—307

NICHOLAS S. RIZZO, Primary Examiner

R. V. RUSH, Assistant Examiner

U.S. Cl. X.R.

260—470, 471 C, 481 C, 482 C; 424—200

UNITED STATES PATENT OFFICE
CERTIFICATE OF CORRECTION

Patent No. 3,798,230    Dated March 19, 1974

Inventor(s) Peter Beutel et al

It is certified that error appears in the above-identified patent and that said Letters Patent are hereby corrected as shown below:

Column 1, line 24, "thionophospnate" should read -- thionophosphate --.

Column 1, line 34, "chlorobenzoxazoline" should read -- chlorobenzoxazolone --

Column 2, line 69, "mils" should read -- mls. --.

Column 3, line 10, "2 mole" should read -- 1 mole --.

Signed and sealed this 5th day of November 1974.

(SEAL)
Attest:

McCOY M. GIBSON JR.
Attesting Officer

C. MARSHALL DANN
Commissioner of Patents